United States Patent
Chen et al.

(10) Patent No.: US 9,292,921 B2
(45) Date of Patent: Mar. 22, 2016

(54) METHOD AND SYSTEM FOR CONTRAST INFLOW DETECTION IN 2D FLUOROSCOPIC IMAGES

(75) Inventors: Terrence Chen, Princeton, NJ (US); Gareth Funka-Lea, Cranbury, NJ (US); Dorin Comaniciu, Princeton Junction, NJ (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 749 days.

(21) Appl. No.: 13/413,043

(22) Filed: Mar. 6, 2012

(65) Prior Publication Data

US 2012/0230558 A1    Sep. 13, 2012

Related U.S. Application Data (60) Provisional application No. 61/449,863, filed on Mar. 7, 2011.

(51) Int. Cl.
  *G06K 9/00* (2006.01)
  *G06T 7/00* (2006.01)

(52) U.S. Cl.
  CPC ..... *G06T 7/0016* (2013.01); *G06T 2207/10121* (2013.01); *G06T 2207/30101* (2013.01)

(58) Field of Classification Search
  None
  See application file for complete search history.

(56) References Cited

U.S. PATENT DOCUMENTS

| | | |
|---|---|---|
| 7,346,202 B1 | 3/2008 | Schneider |
| 7,587,077 B2 | 9/2009 | Schneider |
| 2008/0166032 A1 | 7/2008 | Schneider |
| 2009/0080728 A1* | 3/2009 | Socher et al. ............ 382/128 |
| 2009/0090873 A1 | 4/2009 | Sapp et al. |
| 2009/0226060 A1* | 9/2009 | Gering et al. ............ 382/128 |
| 2009/0252394 A1* | 10/2009 | Liang et al. ............. 382/131 |
| 2010/0094133 A1 | 4/2010 | Yoshiara et al. |
| 2010/0159497 A1* | 6/2010 | Kimia et al. ............ 435/29 |
| 2010/0222671 A1* | 9/2010 | Cohen et al. ............ 600/424 |
| 2011/0263973 A1 | 10/2011 | Bernhardt et al. |
| 2011/0274333 A1 | 11/2011 | Prevrhal et al. |

OTHER PUBLICATIONS

Condurache, A. et al., "Fast Detection and Processing of Arbitrary Contrast Agent Injections in Coronary Angiography and Fluoroscopy", In: Bildverarbeitung fur die Medizin, pp. 5-9, Berlin (2004).

* cited by examiner

*Primary Examiner* — Weiwen Yang (57) ABSTRACT

A method and system for contrast inflow detection in a sequence of fluoroscopic images is disclosed. Vessel segments are detected in each frame of a fluoroscopic image sequence. A score vector is determined for the fluoroscopic image sequence based on the detected vessel segments in each frame of the fluoroscopic image sequence. It is determined whether a contrast agent injection is present in the fluoroscopic image sequence based on the score vector. If it is determined that a contrast agent injection is present in the fluoroscopic image sequence, a contrast inflow frame, at which contrast agent inflow begins, is detected in the fluoroscopic image sequence based on the score vector.

40 Claims, 4 Drawing Sheets

METHOD AND SYSTEM FOR CONTRAST INFLOW DETECTION IN 2D FLUOROSCOPIC IMAGES

This application claims the benefit of U.S. Provisional Application No. 61/449,863, filed Mar. 7, 2011, the disclosure of which is herein incorporated by reference.

BACKGROUND OF THE INVENTION

The present invention relates to contrast inflow detection in fluoroscopic images, and more particularly, to detecting whether contrast medium is used in a sequence of fluoroscopic images and detecting at which frame in a sequence of fluoroscopic images the contrast inflow begins.

Computer-aided and image-guided interventions have become more important in recent years for advanced cardiovascular treatments. Medical images, such as 2D fluoroscopic (x-ray) images are widely used for pre-operative planning, intra-operative guidance, post-operative assessment. During an intervention, an angiography is often acquired in multiple phases of the procedure. An angiography is typically acquired by injecting a radio-opaque contrast agent into the blood vessels of a patient and then acquiring images using x-ray fluoroscopy. The contrast agent allows a physician to visualize the vessels and the blood flow in the fluoroscopic images.

Although it is often easy for a physician to tell when the contrast agent is present in fluoroscopic images, an automatic contrast inflow detection method is desirable for many computer-aided intervention procedures. Ideally, the overall intensity histograms over the temporal domain can be used to detect sharp changes of image intensity as potential candidates of the start of contrast inflow. However, this works poorly in practice since the moving diaphragm, which often appears in cardiac x-ray images, can easily mislead the contrast inflow detection. A main challenge of contrast inflow detection is due to the variability of the data, especially when the images are acquired in low dose radiation with a lot of noise.

BRIEF SUMMARY OF THE INVENTION

The present invention provides a method and system for automatically detecting contrast agent inflow in a sequence of fluoroscopic images. Embodiments of the present invention provide a learning-based framework to efficiently and robustly detect whether a contrast agent is present in a given sequence. Embodiments of the present invention further detect at which frame the contrast agent starts to present and at which frame the contrast agent reaches its maximum level (usually when the whole vessel tree is visible).

In one embodiment of the present invention, vessel segments are detected in each frame of a fluoroscopic image sequence. A score vector is determined for the fluoroscopic image sequence based on the detected vessel segments in each frame of the fluoroscopic image sequence. It is determined whether a contrast agent injection is present in the fluoroscopic image sequence based on the score vector. If it is determined that a contrast agent injection is present in the fluoroscopic image sequence, a contrast inflow frame, at which contrast agent inflow begins, is detected in the fluoroscopic image sequence based on the score vector These and other advantages of the invention will be apparent to those of ordinary skill in the art by reference to the following detailed description and the accompanying drawings.

DETAILED DESCRIPTION

The present invention relates to a method and system for contrast inflow detection. Embodiments of the present invention are described herein to give a visual understanding of the contrast detection method. A digital image is often composed of digital representations of one or more objects (or shapes). The digital representation of an object is often described herein in terms of identifying and manipulating the object. Such manipulations are virtual manipulations accomplished in the memory or other circuitry/hardware of a computer system. Accordingly, is to be understood that embodiments of the present invention may be performed within a computer system using data stored within the computer system.

Although it is often easy for a physician to tell when the contrast agent is present in fluoroscopic images, an automatic contrast inflow detection method is desirable for many computer-aided intervention procedures. For example, in a stent enhancement application, the algorithm needs to discard frames with contrast agent to prevent the contrast from degrading the performance of the stent enhancement. In another application, in order to generate digital subtraction angiography (DSA)-like enhancement on coronary arteries, the algorithm has to known when the contrast agent starts to present in the images and use all the frames before the contrast agent starts to present as templates. In another application, in order to improve the overlay of a 3D model in contrast-enhanced 2D images, the system has to know when the contrast agent presents in order to align the images with a pre-segmented vessel model. In another application, in order to provide automatic roadmapping, the algorithm needs to known when the contrast agent presents in the image sequence. All of these applications can be streamlined with the robust automatic contrast inflow detection method of the present invention.

Embodiments of the present invention provide a learning-based framework for contrast inflow detection using discriminative learning techniques. Given an input sequence of fluoroscopic images, the framework first determines whether there is a contrast agent injection in the sequence. If there is a contrast agent injection in the sequence, the framework then determines at which frame the contrast inflow begins (i.e., at which frame the contrast presents). This is a much more challenging than to determine the contrast frames given an angiography for which contrast injection is sure. Embodiments of the present invention utilize multi-level classifiers in order to detect whether a contrast injection is present and to detect the frame at which the contrast inflow begins.

Figure 1:
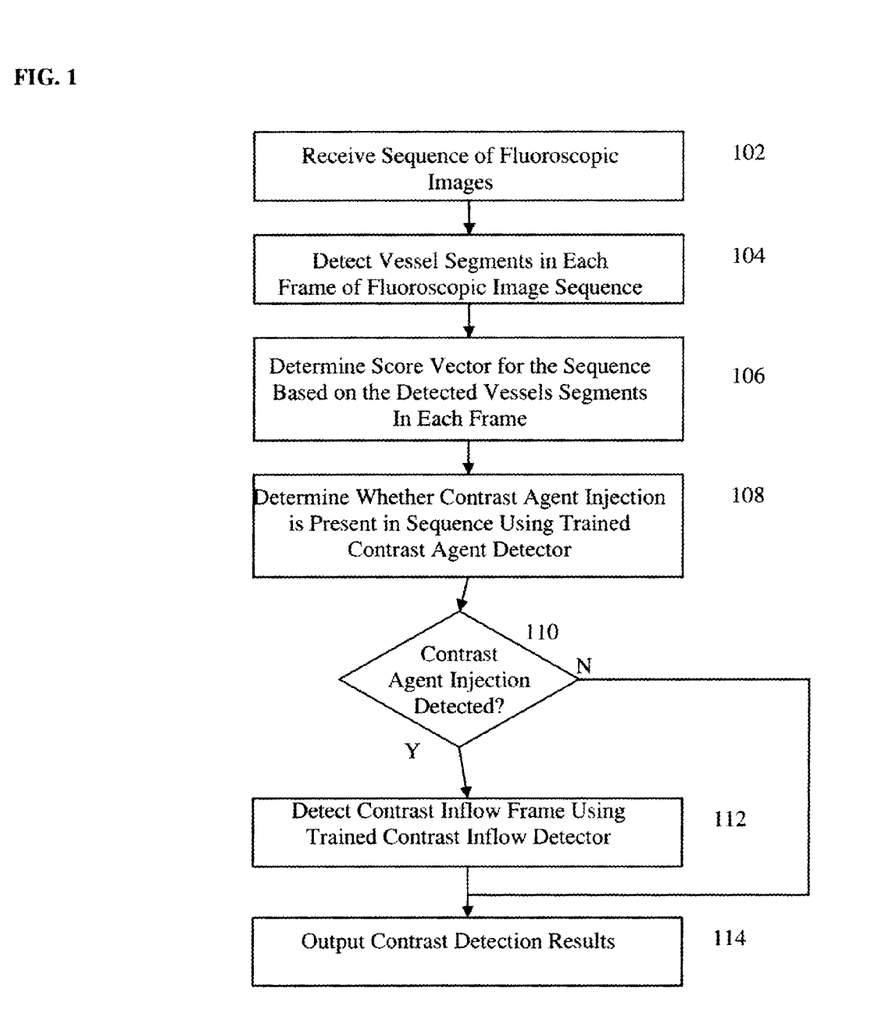
FIG. 1 illustrates a method of contrast inflow detection according to en embodiment of the present invention.
Figure 2:
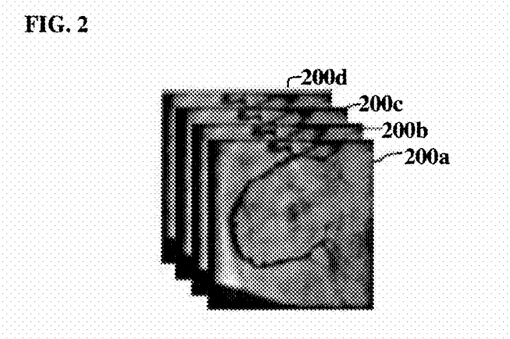
FIG. 2 illustrates an exemplary fluoroscopic image sequence.

FIG. 1 illustrates a method of contrast inflow detection according to en embodiment of the present invention. As illustrated in FIG. 1, at step 102, a fluoroscopic image sequence is received. The fluoroscopic image sequence is a sequence of 2D fluoroscopic (x-ray) images acquired over a time period. Each 2D fluoroscopic image in the sequence is referred to as a frame. The fluoroscopic image sequence can be received directly from an x-ray imaging device. It is also possible that the fluoroscopic image sequence can be received by loading a previously stored fluoroscopic image sequence. FIG. 2 illustrates an exemplary fluoroscopic image sequence. As shown in FIG. 2, the fluoroscopic image sequence includes frames 200a, 200b, 200c, and 200d.

Returning to FIG. 1, at step 104, vessel segments are detected in each frame of the fluoroscopic image sequence. One advantageous aspect of the present invention is the use of discriminative learning techniques to facilitate contrast agent detection. Traditional vesselness measurements typically use different kinds of ridge filters, gradient, and edge filters to estimate the vessel structure inside an image. However, due to the noisy characteristics of x-ray images, false detection can occur frequently. On the other hand, due to the preference of low dose radiation, mis-detection of smaller vessels can easily occur as well. Therefore, the performance of low-level filtering on vessel detection is limited. In an embodiment of the present invention, in order to obtain robust vessel detection, a learning-based classifier is trained to measure the probability of vesselness for each pixel in a 2D fluoroscopic image.

The amount of vessels detectable in an image corresponds to the amount of contrast agent in the vessels when the image is acquired. In order to obtain a probability score for how much contrast is present in an image, a binary classifier is implemented as a vessel segment detector, which is trained from a set of annotated training images. The training images contain vessel and non-vessel fluoroscopic images. The vessel segment detector may be trained from the annotated training images using a probabilistic boosting tree (PBT) algorithm and Haar-like features extracted from the training images. Given an image patch, the trained vessel segment detector calculates the conditional probability that a vessel segment appears in this patch $P(vessel|I_{patch})$.

For efficiency, in an advantageous implementation, the trained vessel detector is applied to a down-sampled image. In particular, each frame of the fluoroscopic image sequence can be resized to 128×128 pixels. A set of steerable features are then applied to each frame to identify ridge points in different orientations in each frame. The trained vessel segment detector is then applied to each ridge point to detect a probability that the ridge point is from a vessel. In particular, the trained vessel segment detector detects the probability that a vessel segment exists in an image patch surrounding each ridge point.

It is to be understood that in the offline training of the vessel segment classifier, the annotated training images are processed in the same way as the frames of the fluoroscopic image sequence during detection in order to generate image patches to use as training samples to train the vessel segment detector. A detected vessel region can be defined as the image area where vessel segments are detected with high probabilities. The remaining area of the image contains primarily background structures and is defined as the background region. In one implementation, 120,000 patches of vessel segments were collected to train the PBT classifier. The same number of negative patches were generated automatically by selecting any position inside a training image that is at least 10 mm away from the positive patches.

Figure 3:
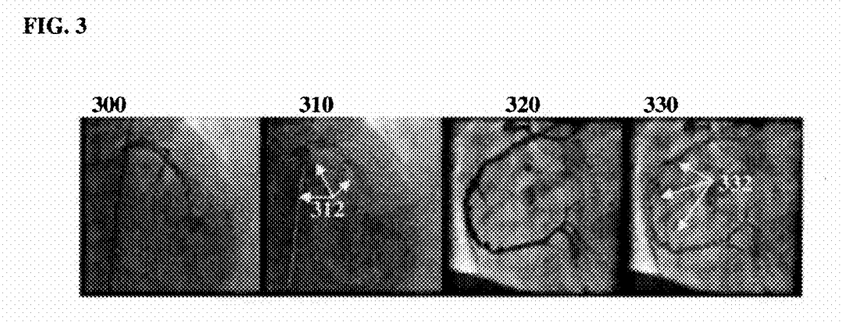
FIG. 3 illustrates exemplary vessel detection results on 2D fluoroscopic images using a trained vessel detector.

FIG. 3 illustrates exemplary vessel detection results on 2D fluoroscopic images using a trained vessel detector. As shown in FIG. 3 images 310 and 330 show vessel segment detection results for input fluoroscopic images 300 and 320, respectively. In particular, images 310 and 330 show detected vessel segments 312 and 332, respectively, detected using a trained vessel detector.

Figure 4:
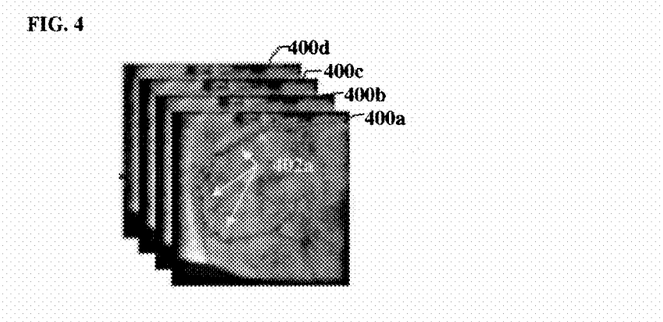
FIG. 4 illustrates vessel segment detection results in a fluoroscopic image sequence.

Returning to FIG. 1, at step 106, a score vector is determined for the fluoroscopic image sequence based on the vessel segments detected in each frame of the fluoroscopic image sequence. FIG. 4 illustrates vessel segment detection results in a fluoroscopic image sequence. As shown in FIG. 4, vessel segments (e.g., 402a) are detected in each frame 400a, 400b, 400c, and 400d of a fluoroscopic image sequence. The vessel segments detected in each frame can give a vessel measure for that frame. Using the vessel measure for each frame, a score vector S can be defined for the fluoroscopic image sequence as:

$$S=\{s_1, s_2, \ldots, s_n\}, \quad (1)$$

where n is the number of frames in the fluoroscopic image sequence, and $s_i = \Sigma P(vessel|I_{patch})$ for all image patches in frame i, which represents the vesselness in the whole image for each frame.

Figure 5:
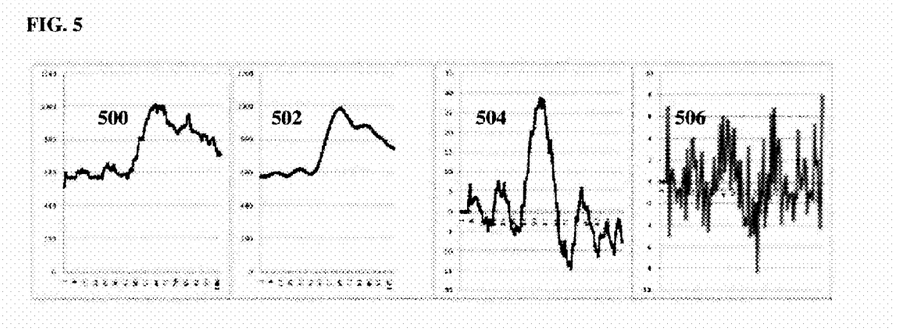
FIG. 5 illustrates a score vector and features extracted from the score vector for an exemplary fluoroscopic image sequence.

Returning to FIG. 1, at step 108, it is determined if a contrast agent injection is present in the fluoroscopic image sequence using a trained contrast agent detector, based on the score vector S of the sequence. Once a score vector S is determined for a sequence, a large number of features can be generated from the score vector S. Such features include smoothed vectors $G_{S_1}, G_{S_2}, \ldots, G_{S_m}$, with m different Gaussian kernels; vectors of first order derivatives $F'_1, F'_2, \ldots, F'_{m+1}$ and vectors of the second order derivatives $F''_1, F''_2, \ldots F''_{m+1}$ for S and $G_{S_1}, G_{S_2}, \ldots, G_{S_m}$; and mean, median, minimum, maximum, and difference between minimum and maximum scores for all of S, $G_S$, F', and F''. It is to be understood that the present invention is not limited to the above features, and other features may be extracted from the score vector S of the sequence as well. FIG. 5 illustrates a score vector and features extracted from the score vector for an exemplary fluoroscopic image sequence. As shown in FIG. 5, curve 500 shows a score vector S for a fluoroscopic image sequence, curve 502 shows a smoothed score vector $G_S$ calculated from S using a Gaussian kernel, curve 504 shows a first order derivative vector F' calculated from S, and curve 506 shows a second order derivative vector F'' calculated from S.

In an advantageous embodiment, a support vector machine (SVM) using a radial basis function (RBF) as a kernel is applied to train a binary classifier (referred to herein as the "contrast agent classifier") to detect whether a given sequence has a contrast agent injection or not. The SVM uses the above described features calculated from the score vectors of annotated fluoroscopic image sequences in order to train the contrast agent classifier. In step 108 of FIG. 1, the features are calculated from the score vector of the received fluoroscopic image sequence, and the trained contrast agent classifier detects whether a contrast agent injection is present in the fluoroscopic image sequence based on the features calculated from the score vector.

Returning to FIG. 1, at step 110, it is determined whether a contrast agent injection was detected in the fluoroscopic image sequence at step 108. If no contrast agent detection was detected in the fluoroscopic image sequence, the method proceeds to step 114. If a contrast agent injection was detected in the fluoroscopic image sequence, the method proceeds to step 112.

At step 112, contrast inflow frame is detected using a trained contrast inflow detector based on the score vector S. When it is detected that a contrast agent injection is present in the fluoroscopic image sequence, the method then detects a which frame in the sequence the contrast begins to present (i.e., at which frame the contrast inflow begins). The frame at which the contrast inflow begins is referred to herein as the contrast inflow frame.

Fluoroscopic image sequences can be obtained using different acquisition frame rates. Accordingly, fluoroscopic images obtained using different acquisition frame rates may exhibit different behaviors on the histogram of S when the contrast agent inflow begins. In order to reduce the complexity due to different acquisition frame rates, the score vector S of the received fluoroscopic image sequence can be re-sized based on the acquisition frame rate. In particular, since the speed of the contrast is the same of that of blood flow, the score vector S of the sequence can be normalized to an acquisition frame rate closer to a speed of the blood flow. In an advantageous implementation, the score vector S of the fluoroscopic image is resized based on the acquisition frame rate to normalize the score vector S to a frame rated of 15 frames per second. Normalizing the frame rate of the score vector S ensures that all the score vectors from all fluoroscopic image sequences to which the contrast inflow detection is being applied are evaluated at the same frame rate, and at the same frame rate as the fluoroscopic image sequences used to train the contrast inflow detector.

The contrast inflow detector is trained offline using annotated training fluoroscopic image sequences. In particular, manual labels of the first frame at which the contrast begins to present are used to annotate all of the training sequences in a database of training data, and this annotated training data is used for supervised learning of the contrast inflow detector. For each training sequence, the score vector S is determined and hundreds of 1D haar features are extracted from each score vector. The labeled frame in each sequence is used as a positive training sample, and al frames in each sequence which are at least two frames away from the labeled frame are used as negative training samples. A PBT classifier can be used to train a classifier P(f|S), where f indicates the index of the frame where the contrast inflow begins. In step 112 of FIG. 1, 1D haar features are extracted from the score vector S of the received fluoroscopic image sequence and the trained contrast inflow detector determines a probability for each frame that the frame is the contrast inflow frame based on the extracted 1D haar features. The frame with the highest probability score from the trained contrast inflow detector, i.e., arg max P(f|S), is selected as the contrast inflow frame.

At step 114, the contrast detection results are output. In the case in which no contrast agent injection is detected by the trained contrast agent detector at step 108, the method terminates without performing step 112 and outputs a message that no contrast agent injected is detected. In the case is which a contrast agent injection is detected at step 108, the method outputs the detected contrast inflow frame. The method can output the index of the detected contrast inflow frame and/or display the detected contrast inflow frame, for example on a display device of a computer system.

The method of FIG. 1 describes detection of a frame at which contrast inflow begins. The method can be similarly applied to detect a different frame related to contrast agent propagation as well. For example, the method can be applied to detect a frame at which a maximum contrast agent exists. For example, a separate detector can be trained from the 1D haar features of the score vector using training sequences for which the maximum contrast frame for each training sequence is annotated and used as a positive training sample. This trained detector can then be used to detect the frame having maximum contrast agent in a received image sequence.

Figure 6:
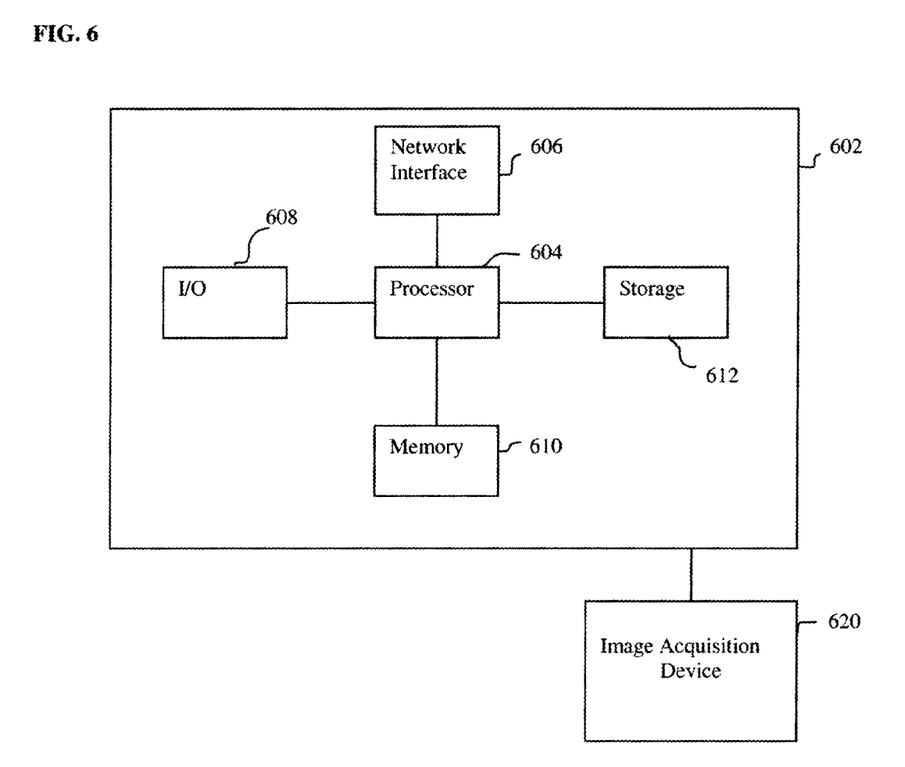
FIG. 6 is a high level block diagram of a computer capable of implementing the present invention.

The above-described methods for contrast inflow detection in a fluoroscopic image sequence may be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612, or other computer readable medium, (e.g., magnetic disk) and loaded into memory 610 when execution of the computer program instructions is desired. Thus, all method steps described above, including the method steps of FIG. 1, may be defined by the computer program instructions stored in the memory 610 and/or storage 612 and controlled by the processor 604 executing the computer program instructions. An image acquisition device 620, such as an X-ray imaging device, can be connected to the computer 602 to input fluoroscopic image sequences to the computer 602. It is possible to implement the image acquisition device 620 and the computer 602 as one device. It is also possible that the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of contrast inflow detection in a fluoroscopic image sequence comprising a plurality of frames, comprising:

detecting vessel segments in each frame of the fluoroscopic image sequence;

determining a score vector for the fluoroscopic image sequence based on the detected vessel segments in each frame of the fluoroscopic image sequence;

detecting, in a first detection operation using a trained contrast agent detector, whether a contrast agent injection is present in the fluoroscopic image sequence based on the score vector; and in response to a determination that a contrast agent injection is present in the fluoroscopic image sequence in the first detection operation, detecting, in a second detection operation using a trained contrast inflow detector, a contrast inflow frame at which contrast agent inflow begins in the fluoroscopic image sequence based on the score vector of the fluoroscopic image sequence, wherein the trained contrast agent detector and the trained contrast inflow detector are different types of trained classifiers.

2. The method of claim 1, wherein the step of detecting vessel segments in each frame of the fluoroscopic image sequence comprises:
   detecting the vessel segments in each frame using a trained vessel segment detector.

3. The method of claim 1, wherein the step of detecting vessel segments in each frame of the fluoroscopic image sequence comprises:
   detecting ridge points in each frame of the fluoroscopic image sequence using a set of steerable filters; and
   determining a probability that a vessel segment exists in an image patch surrounding each ridge point using a trained vessel segment detector.

4. The method of claim 3, wherein the step of detecting vessel segments in each frame of the fluoroscopic image sequence further comprises:
   down-sampling each frame of the fluoroscopic image sequence prior to detecting the ridge points in each frame of the fluoroscopic image sequence.

5. The method of claim 1, wherein the step of determining a score vector for the fluoroscopic image sequence based on the detected vessel segments in each frame of the fluoroscopic image sequence comprises:
   calculating a vesselness score for each frame of the fluoroscopic image sequence based on the detected vessel segments in each frame, wherein the score vector is a vector of vesselness scores for the frames of the fluoroscopic image sequence.

6. The method of claim 5, wherein the step of detecting vessel segments in each frame of the fluoroscopic image sequence comprises determining a probability score for each of a plurality of image patches in each frame of the fluoroscopic image sequence using a trained vessel segment detector, and the step of calculating a vesselness score for each frame of the fluoroscopic image sequence comprises:
   for each frame, calculating a sum of the probability scores for the plurality of image patches in the frame.

7. The method of claim 1, wherein the step of detecting, in a first detection operation using a trained contrast agent detector, whether a contrast agent injection is present in the fluoroscopic image sequence based on the score vector comprises:
   calculating a plurality of features from the score vector of the fluoroscopic image sequence; and
   detecting whether a contrast agent injection is present in the fluoroscopic image sequence based on the features calculated from the score vector using the trained contrast agent detector.

8. The method of claim 7, wherein the plurality of features includes smoothed score vectors calculated using a plurality of different Gaussian kernels; vectors of first order derivatives and vectors of the second order derivatives for the score vector and each of the smoothed score vectors; and a mean, a median, a minimum, a maximum, and a difference between minimum and maximum scores for all of the score vector, the smoothed score vectors, the first order derivative vectors, and the second order derivative vectors.

9. The method of claim 7, wherein the trained contrast agent detector is a binary support vector machine (SVM) classifier trained based on annotated training data.

10. The method of claim 1, wherein the step of detecting, in a second detection operation using a trained contrast inflow detector, a contrast inflow frame at which contrast agent inflow begins in the fluoroscopic image sequence based on the score vector of the fluoroscopic image sequence comprises:
    extracting 1D haar features from the score vector of the fluoroscopic image sequence; and
    detecting the contrast inflow frame based on the 1D haar features extracted from the score vector of the fluoroscopic image sequence using the trained contrast inflow detector.

11. The method of claim 10, wherein the trained contrast inflow detector is a probabilistic boosting tree (PBT) classifier trained based on annotated training data.

12. The method of claim 10, wherein the step of detecting the contrast inflow frame based on the 1D haar features extracted from the score vector of the fluoroscopic image sequence using the trained contrast inflow detector comprises:
    determining a probability score for each frame of the fluoroscopic image sequence using the trained contrast inflow detector; and
    selecting a frame having a highest probability score as the contrast inflow frame.

13. The method of claim 10, wherein the step of detecting, in a second detection operation using a trained contrast inflow detector, a contrast inflow frame at which contrast agent inflow begins in the fluoroscopic image sequence based on the score vector of the fluoroscopic image sequence further comprises:
    resizing the score vector of the fluoroscopic image sequence to normalize the score vector to pre-determined acquisition frame rate prior to the step of extracting 1D haar features.

14. An apparatus for contrast inflow detection in a fluoroscopic image sequence comprising a plurality of frames, comprising:
    a processor; and
    a memory storing computer program instructions, which when executed by the processor cause the processor to perform operations comprising:
    detecting vessel segments in each frame of the fluoroscopic image sequence;
    determining a score vector for the fluoroscopic image sequence based on the detected vessel segments in each frame of the fluoroscopic image sequence;
    detecting, in a first detection operation using a trained contrast agent detector, whether a contrast agent injection is present in the fluoroscopic image sequence based on the score vector; and
    in response to a determination that a contrast agent injection is present in the fluoroscopic image sequence in the first detection operation, detecting, in a second detection operation using a trained contrast inflow detector, a contrast inflow frame at which contrast agent inflow begins in the fluoroscopic image sequence based on the score vector of the fluoroscopic image sequence, wherein the trained contrast agent detector and the trained contrast inflow detector are different types of trained classifiers.

15. The apparatus of claim 14, wherein detecting vessel segments in each frame of the fluoroscopic image sequence comprises:
    detecting the vessel segments in each frame using a trained vessel segment detector.

16. The apparatus of claim 14, wherein detecting vessel segments in each frame of the fluoroscopic image sequence comprises:
    detecting ridge points in each frame of the fluoroscopic image sequence using a set of steerable filters; and determining a probability that a vessel segment exists in an image patch surrounding each ridge point using a trained vessel segment detector.

17. The apparatus of claim 14, wherein determining a score vector for the fluoroscopic image sequence based on the detected vessel segments in each frame of the fluoroscopic image sequence comprises:
calculating a vesselness score for each frame of the fluoroscopic image sequence based on the detected vessel segments in each frame, wherein the score vector is a vector of vesselness scores for the frames of the fluoroscopic image sequence.

18. The apparatus of claim 17, wherein detecting vessel segments in each frame of the fluoroscopic image sequence comprises:
determining a probability score for each of a plurality of image patches in each frame of the fluoroscopic image sequence using a trained vessel segment detector; and
calculating a vesselness score for each frame of the fluoroscopic image sequence comprises:
calculating a sum of the probability scores for the plurality of image patches in each frame.

19. The apparatus of claim 14, detecting, in a first detection operation using a trained contrast agent detector, whether a contrast agent injection is present in the fluoroscopic image sequence based on the score vector comprises:
calculating a plurality of features from the score vector of the fluoroscopic image sequence; and
detecting whether a contrast agent injection is present in the fluoroscopic image sequence based on the features calculated from the score vector using the trained contrast agent detector.

20. The apparatus of claim 19, wherein the plurality of features includes smoothed score vectors calculated using a plurality of different Gaussian kernels; vectors of first order derivatives and vectors of the second order derivatives for the score vector and each of the smoothed score vectors; and a mean, a median, a minimum, a maximum, and a difference between minimum and maximum scores for all of the score vector, the smoothed score vectors, the first order derivative vectors, and the second order derivative vectors.

21. The apparatus of claim 19, wherein the trained contrast agent detector is a binary support vector machine (SVM) classifier trained based on annotated training data.

22. The apparatus of claim 14, wherein detecting, in a second detection operation using a trained contrast inflow detector, a contrast inflow frame at which contrast agent inflow begins in the fluoroscopic image sequence based on the score vector of the fluoroscopic image sequence comprises:
extracting 1D haar features from the score vector of the fluoroscopic image sequence; and
detecting the contrast inflow frame based on the 1D haar features extracted from the score vector of the fluoroscopic image sequence using the trained contrast inflow detector.

23. The apparatus of claim 22, wherein the trained contrast inflow detector is a probabilistic boosting tree (PBT) classifier trained based on annotated training data.

24. The apparatus of claim 22, wherein detecting the contrast inflow frame based on the 1D haar features extracted from the score vector of the fluoroscopic image sequence using the trained contrast inflow detector comprises:
determining a probability score for each frame of the fluoroscopic image sequence using the trained contrast inflow detector; and
selecting a frame having a highest probability score as the contrast inflow frame.

25. A non-transitory computer readable medium encoded with computer executable instructions for contrast inflow detection in a fluoroscopic image sequence comprising a plurality of frames, the computer executable instructions defining a method comprising:
detecting vessel segments in each frame of the fluoroscopic image sequence;
determining a score vector for the fluoroscopic image sequence based on the detected vessel segments in each frame of the fluoroscopic image sequence;
detecting, in a first detection operation using a trained contrast agent detector, whether a contrast agent injection is present in the fluoroscopic image sequence based on the score vector; and
in response to a determination that a contrast agent injection is present in the fluoroscopic image sequence in the first detection operation, detecting, in a second detection operation using a trained contrast inflow detector, a contrast inflow frame at which contrast agent inflow begins in the fluoroscopic image sequence based on the score vector of the fluoroscopic image sequence, wherein the trained contrast agent detected and the trained contrast inflow detector are different types of trained classifiers.

26. The non-transitory computer readable medium of claim 25, wherein the step of detecting vessel segments in each frame of the fluoroscopic image sequence comprises:
detecting the vessel segments in each frame using a trained vessel segment detector.

27. The non-transitory computer readable medium of claim 25, wherein the step of detecting vessel segments in each frame of the fluoroscopic image sequence comprises:
detecting ridge points in each frame of the fluoroscopic image sequence using a set of steerable filters; and
determining a probability that a vessel segment exists in an image patch surrounding each ridge point using a trained vessel segment detector.

28. The non-transitory computer readable medium of claim 27, wherein the step of detecting vessel segments in each frame of the fluoroscopic image sequence further comprises:
down-sampling each frame of the fluoroscopic image sequence prior to detecting the ridge points in each frame of the fluoroscopic image sequence.

29. The non-transitory computer readable medium of claim 25, wherein the step of determining a score vector for the fluoroscopic image sequence based on the detected vessel segments in each frame of the fluoroscopic image sequence comprises:
calculating a vesselness score for each frame of the fluoroscopic image sequence based on the detected vessel segments in each frame, wherein the score vector is a vector of vesselness scores for the frames of the fluoroscopic image sequence.

30. The non-transitory computer readable medium of claim 29, wherein the step of detecting vessel segments in each frame of the fluoroscopic image sequence comprises determining a probability score for each of a plurality of image patches in each frame of the fluoroscopic image sequence using a trained vessel segment detector, and the step of calculating a vesselness score for each frame of the fluoroscopic image sequence comprises:
for each frame, calculating a sum of the probability scores for the plurality of image patches in the frame.

31. The non-transitory computer readable medium of claim 25, wherein the step of detecting, in a first detection operation using a trained contrast agent detector, whether a contrast agent injection is present in the fluoroscopic image sequence based on the score vector comprises:

calculating a plurality of features from the score vector of the fluoroscopic image sequence; and detecting whether a contrast agent injection is present in the fluoroscopic image sequence based on the features calculated from the score vector using the trained contrast agent detector.

32. The non-transitory computer readable medium of claim 31, wherein the plurality of features includes smoothed score vectors calculated using a plurality of different Gaussian kernels; vectors of first order derivatives and vectors of the second order derivatives for the score vector and each of the smoothed score vectors; and a mean, a median, a minimum, a maximum, and a difference between minimum and maximum scores for all of the score vector, the smoothed score vectors, the first order derivative vectors, and the second order derivative vectors.

33. The non-transitory computer readable medium of claim 31, wherein the trained contrast agent detector is a binary support vector machine (SVM) classifier trained based on annotated training data.

34. The non-transitory computer readable medium of claim 25, wherein the step of detecting, in a second detection operation using a trained contrast inflow detector, a contrast inflow frame at which contrast agent inflow begins in the fluoroscopic image sequence based on the score vector of the fluoroscopic image sequence comprises:

extracting 1D haar features from the score vector of the fluoroscopic image sequence; and detecting the contrast inflow frame based on the 1D haar features extracted from the score vector of the fluoroscopic image sequence using the trained contrast inflow detector.

35. The non-transitory computer readable medium of claim 34, wherein the trained contrast inflow detector is a probabilistic boosting tree (PBT) classifier trained based on annotated training data.

36. The non-transitory computer readable medium of claim 34, wherein the step of detecting the contrast inflow frame based on the 1D haar features extracted from the score vector of the fluoroscopic image sequence using the trained contrast inflow detector comprises:

determining a probability score for each frame of the fluoroscopic image sequence using the trained contrast inflow detector; and selecting a frame having a highest probability score as the contrast inflow frame.

37. The non-transitory computer readable medium of claim 34, wherein the step of detecting, in a second detection operation using a trained contrast inflow detector, a contrast inflow frame at which contrast agent inflow begins in the fluoroscopic image sequence based on the score vector of the fluoroscopic image sequence further comprises:

resizing the score vector of the fluoroscopic image sequence to normalize the score vector to pre-determined acquisition frame rate prior to the step of extracting 1D haar features.

38. The method of claim 1, wherein the trained contrast agent detector used in the first detection operation is a trained binary support vector machine (SVM) classifier and the trained contrast inflow detector used in the second detection operation is a trained probabilistic boosting tree (PBT) classifier.

39. The apparatus of claim 14, wherein the trained contrast agent detector used in the first detection operation is a trained binary support vector machine (SVM) classifier and the trained contrast inflow detector used in the second detection operation is a trained probabilistic boosting tree (PBT) classifier.

40. The non-transitory computer readable medium of claim 25, wherein the trained contrast agent detector used in the first detection operation is a trained binary support vector machine (SVM) classifier and the trained contrast inflow detector used in the second detection operation is a trained probabilistic boosting tree (PBT) classifier.

* * * * *